United States Patent
Kirkby et al.

(10) Patent No.: US 9,537,968 B1
(45) Date of Patent: Jan. 3, 2017

(54) COMMUNICATION OF SOCKET PROTOCOL BASED DATA OVER A STORAGE PROTOCOL BASED INTERFACE

(71) Applicant: GOOGLE INC., Mountain View, CA (US)

(72) Inventors: Ronald Loren Kirkby, Burlingame, CA (US); Gregory R. Duffy, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 403 days.

(21) Appl. No.: 13/733,788

(22) Filed: Jan. 3, 2013

Related U.S. Application Data (60) Provisional application No. 61/583,992, filed on Jan. 6, 2012.

(51) Int. Cl.
*H04L 29/08* (2006.01)
*H04L 29/06* (2006.01)

(52) U.S. Cl.
CPC ........... *H04L 67/2823* (2013.01); *H04L 67/28* (2013.01); *H04L 67/2828* (2013.01); *H04L 67/2838* (2013.01); *H04L 69/08* (2013.01); *H04L 67/02* (2013.01)

(58) Field of Classification Search
CPC .......... H04L 67/04; H04L 67/20; H04L 67/34; H04L 47/10; H04L 67/02; H04L 67/14; H04L 67/1097; H04L 67/28; H04L 67/2809; H04L 67/2823; H04L 67/2828; H04L 27/2838; H04L 69/08; H04N 7/15; H04N 7/17318

See application file for complete search history.

(56) References Cited

U.S. PATENT DOCUMENTS

| | | | |
|---|---|---|---|
| 2,997,935 | A | 8/1961 | Hermann |
| 3,782,260 | A | 1/1974 | Ettischer et al. |
| D349,914 | S | 8/1994 | Usui |
| D357,267 | S | 4/1995 | Yotsuya |
| D372,490 | S | 8/1996 | Sheffield et al. |
| D385,571 | S | 10/1997 | Abrams |
| 5,862,428 | A | 1/1999 | An |
| 5,963,253 | A | 10/1999 | Dwyer |

(Continued)

OTHER PUBLICATIONS

USB/IP Project, "USB Request Over IP Network", Dec. 27, 2011, http://web.archive.org/web/20111227171215/http://usbip.sourceforge.net/.*

(Continued)

*Primary Examiner* — Ramy M Osman
(74) *Attorney, Agent, or Firm* — Morgan, Lewis & Bockius LLP (57) ABSTRACT

Data communication includes: in a transmit mode: encapsulating first socket protocol based data into first storage protocol based data; receiving a first storage protocol based read request via a storage protocol based interface; and sending the first storage protocol based data in response to the first storage protocol based read request. In a receive mode: receiving a first storage protocol based write request that includes second storage protocol based data, wherein second socket protocol based data is encapsulated within the second storage protocol based data; and processing the first storage protocol based write request to obtain the second socket protocol based data.

16 Claims, 9 Drawing Sheets

(56) References Cited

U.S. PATENT DOCUMENTS

| | | |
|---|---|---|
| 5,978,028 A | 11/1999 | Yamane |
| D429,269 S | 8/2000 | Renkis |
| D429,743 S | 8/2000 | Renkis |
| 6,147,701 A | 11/2000 | Tamura et al. |
| D445,123 S | 7/2001 | Shen |
| 6,268,882 B1 | 7/2001 | Elberbaum |
| D446,534 S | 8/2001 | Zimmer |
| D447,758 S | 9/2001 | Lin et al. |
| D449,630 S | 10/2001 | Rak et al. |
| D452,259 S | 12/2001 | Choi |
| 6,357,936 B1 | 3/2002 | Elberbaum |
| D455,164 S | 4/2002 | Tsang et al. |
| 6,462,781 B1 | 10/2002 | Arnold |
| D467,952 S | 12/2002 | Nakamura |
| D469,775 S | 2/2003 | Bradley |
| D470,874 S | 2/2003 | Chiu |
| 6,515,275 B1 | 2/2003 | Hunter et al. |
| 6,634,804 B1 | 10/2003 | Toste et al. |
| 6,650,694 B1 | 11/2003 | Brown et al. |
| 6,678,001 B1 | 1/2004 | Elberbaum |
| 6,727,954 B1 | 4/2004 | Okada et al. |
| D489,388 S | 5/2004 | Saito et al. |
| 6,762,790 B1 | 7/2004 | Matko et al. |
| D511,352 S | 11/2005 | Oliver et al. |
| 7,066,664 B1 | 6/2006 | Sitoh et al. |
| 7,076,162 B2 | 7/2006 | Yamashita |
| D527,755 S | 9/2006 | Wu |
| D534,938 S | 1/2007 | Beasley et al. |
| D537,097 S | 2/2007 | Freeman |
| D542,320 S | 5/2007 | Cheng |
| D552,649 S | 10/2007 | Logan et al. |
| D552,659 S | 10/2007 | Stephens et al. |
| D555,692 S | 11/2007 | Liu et al. |
| 7,290,740 B2 | 11/2007 | Joy et al. |
| D558,250 S | 12/2007 | Hsia |
| D563,446 S | 3/2008 | Stephens et al. |
| D575,316 S | 8/2008 | Liu et al. |
| 7,552,340 B2* | 6/2009 | Ooi .................. G06F 21/10 713/186 |
| 7,586,537 B2 | 9/2009 | Konishi et al. |
| D606,105 S | 12/2009 | Hinkel |
| 7,646,425 B2 | 1/2010 | Bohaker et al. |
| D610,601 S | 2/2010 | Melder |
| D614,223 S | 4/2010 | Kim et al. |
| D627,815 S | 11/2010 | Oba |
| 7,930,369 B2* | 4/2011 | Marriott et al. ............... 709/220 |
| D638,461 S | 5/2011 | Kim et al. |
| 7,986,369 B1 | 7/2011 | Burns |
| D651,229 S | 12/2011 | Tan et al. |
| D651,230 S | 12/2011 | Tan et al. |
| 8,072,536 B1 | 12/2011 | Campbell |
| D651,633 S | 1/2012 | Park et al. |
| 8,139,122 B2 | 3/2012 | Rolston |
| D657,410 S | 4/2012 | Helaoui et al. |
| 8,165,146 B1* | 4/2012 | Melick et al. ................ 709/231 |
| 8,174,972 B2* | 5/2012 | Cernius .................. H04L 69/12 370/229 |
| D678,929 S | 3/2013 | Hancock |
| 8,402,145 B2* | 3/2013 | Holden et al. ............... 709/227 |
| 8,504,707 B2* | 8/2013 | Toebes .................. H04L 67/2823 370/465 |
| D694,305 S | 11/2013 | Katori et al. |
| D697,119 S | 1/2014 | Park et al. |
| 8,625,024 B2 | 1/2014 | Hsu |
| D719,205 S | 12/2014 | Matsumoto |
| D729,296 S | 5/2015 | Shelton |
| D730,422 S | 5/2015 | Kim et al. |
| D733,781 S | 7/2015 | Chen |
| D734,801 S | 7/2015 | Yang |
| 9,102,055 B1 | 8/2015 | Konolige et al. |
| D740,871 S | 10/2015 | Moon et al. |
| D742,954 S | 11/2015 | Simonelli et al. |
| D743,465 S | 11/2015 | Aglassinger et al. |
| D745,916 S | 12/2015 | Oh |
| D746,350 S | 12/2015 | Li |
| D748,709 S | 2/2016 | Jeong |
| D755,880 S | 5/2016 | Luo et al. |
| 9,330,307 B2 | 5/2016 | Litvak et al. |
| 2002/0107591 A1* | 8/2002 | Gabai et al. .................... 700/94 |
| 2002/0141418 A1* | 10/2002 | Ben-Dor .......... H04L 12/40123 370/398 |
| 2002/0186317 A1 | 12/2002 | Kayanuma |
| 2002/0191082 A1 | 12/2002 | Fujino et al. |
| 2003/0164881 A1 | 9/2003 | Ohe et al. |
| 2003/0169354 A1 | 9/2003 | Aotsuka |
| 2003/0193409 A1 | 10/2003 | Crank |
| 2003/0216151 A1 | 11/2003 | Kitano et al. |
| 2004/0132489 A1 | 7/2004 | Ryley et al. |
| 2004/0211868 A1 | 10/2004 | Holmes et al. |
| 2004/0247203 A1 | 12/2004 | Dell'Eva |
| 2005/0062720 A1 | 3/2005 | Rotzoll et al. |
| 2005/0128336 A1 | 6/2005 | Toledano et al. |
| 2005/0149213 A1* | 7/2005 | Guzak et al. .................... 700/94 |
| 2005/0151042 A1 | 7/2005 | Watson |
| 2005/0200751 A1 | 9/2005 | Weaver |
| 2005/0212958 A1 | 9/2005 | Su et al. |
| 2005/0227217 A1 | 10/2005 | Wilson |
| 2005/0230583 A1 | 10/2005 | Wu |
| 2005/0237425 A1 | 10/2005 | Lee et al. |
| 2005/0243022 A1 | 11/2005 | Negru |
| 2005/0243199 A1 | 11/2005 | Bohaker et al. |
| 2005/0275723 A1 | 12/2005 | Sablak et al. |
| 2006/0086871 A1 | 4/2006 | Joseph et al. |
| 2006/0109375 A1 | 5/2006 | Ho et al. |
| 2006/0109613 A1 | 5/2006 | Chen |
| 2006/0123129 A1* | 6/2006 | Toebes ............... H04L 67/2823 709/230 |
| 2006/0123166 A1* | 6/2006 | Toebes .................. H04L 69/08 710/106 |
| 2006/0210259 A1 | 9/2006 | Matsumoto |
| 2006/0262194 A1 | 11/2006 | Swain |
| 2006/0282866 A1 | 12/2006 | Kuo |
| 2007/0001087 A1 | 1/2007 | Shyu et al. |
| 2007/0011375 A1* | 1/2007 | Kumar ............... G06F 13/4009 710/106 |
| 2007/0036539 A1 | 2/2007 | Martinez et al. |
| 2007/0083791 A1 | 4/2007 | Panesar et al. |
| 2007/0222888 A1 | 9/2007 | Xiao et al. |
| 2008/0001547 A1 | 1/2008 | Negru |
| 2008/0005432 A1* | 1/2008 | Kagawa ............... G06F 13/102 710/106 |
| 2008/0074535 A1 | 3/2008 | Ohsuga |
| 2008/0151052 A1 | 6/2008 | Erel et al. |
| 2008/0186150 A1 | 8/2008 | Kao |
| 2008/0189352 A1 | 8/2008 | Mitchell et al. |
| 2008/0291260 A1 | 11/2008 | Dignan et al. |
| 2008/0309765 A1 | 12/2008 | Dayan et al. |
| 2009/0019187 A1* | 1/2009 | Okuma ............... H04L 67/327 710/9 |
| 2009/0027570 A1 | 1/2009 | Fujinawa |
| 2009/0102715 A1 | 4/2009 | Lou et al. |
| 2009/0141918 A1 | 6/2009 | Chris et al. |
| 2009/0141939 A1 | 6/2009 | Chambers et al. |
| 2009/0195655 A1 | 8/2009 | Pandey |
| 2009/0245268 A1* | 10/2009 | Pugliese, IV .......... H04L 12/10 370/401 |
| 2009/0248918 A1* | 10/2009 | Diab ................... G06F 13/385 710/51 |
| 2009/0289921 A1 | 11/2009 | Mickelson et al. |
| 2009/0296735 A1* | 12/2009 | Cernius ............... H04L 69/12 370/464 |
| 2009/0309969 A1 | 12/2009 | Wendler |
| 2010/0026811 A1 | 2/2010 | Palmer |
| 2010/0076600 A1 | 3/2010 | Cross et al. |
| 2010/0109878 A1 | 5/2010 | Desrosiers |
| 2010/0180012 A1 | 7/2010 | Heo et al. |
| 2010/0199157 A1 | 8/2010 | Takaoka et al. |
| 2010/0271503 A1 | 10/2010 | Safaee-Rad et al. |
| 2010/0306399 A1* | 12/2010 | Khosravi ............... H04L 67/34 709/231 |
| 2010/0314508 A1 | 12/2010 | Bevirt et al. |
| 2010/0328475 A1 | 12/2010 | Thomas et al. |
| 2011/0007159 A1 | 1/2011 | Camp et al. |

(56) References Cited

U.S. PATENT DOCUMENTS

| | | | |
|---|---|---|---|
| 2011/0102438 A1 | 5/2011 | Mathe et al. | |
| 2011/0102588 A1 | 5/2011 | Trundle et al. | |
| 2011/0134313 A1 | 6/2011 | Kato | |
| 2011/0161076 A1 | 6/2011 | Davis et al. | |
| 2011/0193964 A1 | 8/2011 | McLeod | |
| 2011/0193967 A1 | 8/2011 | Matsumoto et al. | |
| 2011/0205965 A1* | 8/2011 | Sprigg | G06F 9/4411 370/328 |
| 2011/0231903 A1* | 9/2011 | Springer | H04L 67/2804 726/3 |
| 2011/0234803 A1 | 9/2011 | Nakajima et al. | |
| 2011/0267492 A1 | 11/2011 | Prentice et al. | |
| 2011/0285813 A1 | 11/2011 | Girdzijauskas et al. | |
| 2011/0293137 A1 | 12/2011 | Gurman et al. | |
| 2011/0299728 A1 | 12/2011 | Markovic et al. | |
| 2012/0081009 A1 | 4/2012 | Shteynberg | |
| 2012/0105632 A1 | 5/2012 | Renkis | |
| 2012/0127270 A1 | 5/2012 | Zhang et al. | |
| 2012/0140068 A1 | 6/2012 | Monroe et al. | |
| 2012/0162416 A1 | 6/2012 | Su et al. | |
| 2012/0194650 A1 | 8/2012 | Izadi et al. | |
| 2012/0236373 A1 | 9/2012 | Oyama | |
| 2012/0246359 A1* | 9/2012 | Scragg, Jr. | G06F 13/10 710/63 |
| 2012/0262575 A1 | 10/2012 | Champagne et al. | |
| 2013/0053657 A1 | 2/2013 | Ziarno et al. | |
| 2013/0156260 A1 | 6/2013 | Craig | |
| 2013/0162629 A1 | 6/2013 | Huang et al. | |
| 2013/0314544 A1 | 11/2013 | Ban | |
| 2013/0321564 A1 | 12/2013 | Smith et al. | |
| 2013/0342653 A1 | 12/2013 | McCloskey et al. | |
| 2014/0032796 A1* | 1/2014 | Krause | 710/29 |
| 2014/0047143 A1* | 2/2014 | Bateman | H04N 7/181 710/72 |
| 2014/0049609 A1 | 2/2014 | Wilson et al. | |
| 2014/0119604 A1 | 5/2014 | Mai et al. | |
| 2014/0168421 A1 | 6/2014 | Xu et al. | |
| 2014/0241387 A1 | 8/2014 | Ortiz | |
| 2014/0270387 A1 | 9/2014 | Hoof et al. | |
| 2014/0333726 A1 | 11/2014 | Tokui et al. | |
| 2014/0375635 A1 | 12/2014 | Johnson et al. | |
| 2015/0052029 A1 | 2/2015 | Wu et al. | |
| 2015/0120389 A1* | 4/2015 | Zhang | G06Q 10/10 705/7.32 |
| 2015/0154467 A1 | 6/2015 | Feng et al. | |
| 2015/0170371 A1 | 6/2015 | Muninder et al. | |
| 2015/0181198 A1 | 6/2015 | Baele et al. | |
| 2015/0228114 A1 | 8/2015 | Shapira et al. | |
| 2016/0012588 A1 | 1/2016 | Taguchi et al. | |
| 2016/0022181 A1 | 1/2016 | Valsan et al. | |
| 2016/0094763 A1 | 3/2016 | Patel | |
| 2016/0094829 A1 | 3/2016 | Georgiev et al. | |

OTHER PUBLICATIONS

FabulaTech, "What is USB for Remote Desktop", Dec. 12, 2011, http://web.archive.org/web/20111212070644/http://www.usb-over-network.com/usb-for-remote-desktop.html.*

FabulaTech, "What is USB over Network", Dec. 17, 2011, http://web.archive.org/web/20111217080253/http://www.usb-over-network.com/usb-over-network.html.*

Parent, Thierry, "Android USB Port Forwarding", Dec. 26, 2011, http://www.codeproject.com/Articles/191930/Android-Usb-Port-Forwarding.*

0308 Brand USB 2.0 HD Night Vision Webcam Web Cam Camera Webcamera With Microphone Sucker Stand for PC Computer Laptop Notebook, Dec. 18, 2015, 13 pgs.

720p TF Card IP Wireless Camera Indoor Built-In Microphone Support Two Way Intercom for Smart Home Life and Unique PIR Alarm, Dec. 18, 2015, 3 pgs.

Adipranata, Fast method for multiple human face segmentation in color image, 2008 Second Int'l Conference on Future Generation Communication and Networking, IEEE, 2008, 4 pgs.

Buy Svb Ladybird Tripod Webcam 4 Mega Pixel—4 Megapixel Web Cam Online, Best Prices in India: Rediff Shopping, Dec. 16, 2015, 3 pgs.

Drivers—Video Cam: Download Drivers for (Genius VideoCAM NB) Visual/Video Camera, Computer Question Help, Jul. 3, 2008, 2 pgs.

Ebay, Belkin F7D7601AU, Net Cam IP WIFI Baby Pet Monitor Camera Security Night Vision, Dec. 15, 2015, 5 pgs.

Ebay, Lot of 2 USB WebCam Web Cam Camera Logitech Quickcam HP Hewlett Packard, Dec. 16, 2015, 3 pgs.

Ebay, Motorola, MBP421 Digital Video & Sound Rechargeable Baby Monitor 1.8" LCD Screen, Dec. 15, 2015, 5 pgs.

Ebay, New Smallest Mini Camera Camcorder Video Recorder DVR Spy Hidden Pinhole Web Cam, Dec. 2, 2015, 4 pgs.

Good in Stock PC Camera USB Plug and Play Free Driver Digital Webcam Stand Web Camera, Dec. 18, 2015, 12 pgs.

Hampapur, Smart Surveillance: applications, technologies and implications, Information Communications and Signal Processing 2, 2003, pp. 1133-1138.

Heo, Fusion of visual and thermal face recognition techniques: A Comparative study. Univ. of Tennessee, Knoxville, TN, 2003, 75 pgs.

Input Devies on Pintrest, Computers, Mice and Apples, Tanna Darty, Dec. 15, 2015, 1 pg.

Ion camera, The Home Pro Wi-Fi Wireless Cloud Video Monitoring Security Camera (Black): Camera & Photo, Dec. 15, 2015, 6 pgs.

Joel Johnson, Glowdoodle Turns Your Crappy Webcam in a Crappier Wecam (in a good way), webcam—Boing Boing, Dec. 16, 2015, 8 pgs.

John Lewis, Samsung SEB-1019RW Adds-On Night Vision Baby Monitor Camera, Dec. 15, 2015, 2 pgs.

KYO-TUX, IconArchive, Device WebCam Icon, Phuzion Inconset, Jun. 8, 2010, 3 pgs.

Linksys Wireless-N Internet Home Monitoring Camera: Home Security Systems: Camera & Photo, Amazon.com, Dec. 15, 2015, 7 pgs.

Logi Circle: Portable Home Surveillance Camera from Logitech (video), AppleApple.Top World News, Feb. 10, 2015, 5 pgs.

Mini Universal Tripod Stand for Digital Camera and Webcam A33—in Tripods from Consumer Electronics on Aliexpress.com, Alibaba Group, Store: Angel One-Stop Shopping Center, Dec. 16, 2015, 3 pgs.

Restore.Solutions, Numus Software, USB/VID, Syntek Web Cam Device Drivers, Dec. 12, 2015, 10 pgs.

Silberman, Indoor Segmentation and Support Ingerence from RGBD Images, Computer Vision—ECCV 2012, Springer Berlin Heidelbert, Oct. 2012, pp. 746-780.

SIV AI-BALL Very Small Hidden IP Network Camera battery Powered Wireless IP Camera, Alibaba.com. 1999-2015, 7 pgs.

TechAllianz, How to Pick The Right Webcam, Satyakam, Jan. 22, 2013, 4 pgs.

TREK Ai-Ball Mini WiFi Spy Cam IP Wireless Camera for Iphone / Android /Ipad, Tmart, www.tmart.com, Dec. 18, 2015, 6 pgs.

Tripod Support for QuickCam (or other webcam), Instructables, 2015, 3 pgs.

Web Camera 6 Stock Photo, Dreamstime, Dec. 16, 2015, 2 pgs.

* cited by examiner

FIG. 8

COMMUNICATION OF SOCKET PROTOCOL BASED DATA OVER A STORAGE PROTOCOL BASED INTERFACE

CROSS REFERENCE TO OTHER APPLICATIONS

This application claims priority to U.S. Provisional Patent Application No. 61/583,992 entitled COMMUNICATION OF SOCKET PROTOCOL BASED DATA OVER A STORAGE PROTOCOL BASED INTERFACE filed Jan. 6, 2012 which is incorporated herein by reference for all purposes.

BACKGROUND OF THE INVENTION

Configuration and management of electronic devices, particularly "headless" devices that do not include any user interfaces for direct user input and/or display, can be challenging to the end users and as well as the manufacturers. Typically, such devices are configured by attaching the device to a host such as a personal computer, which retrieves a device driver by downloading from a website or reading from a storage location such as a CD-ROM. The device driver is then installed on the host to facilitate the communication between the device, the host, and/or a third party system such as a remote server. Such an installation process can be complex and error prone.

One way to simplify the configuration procedure is to certify the device driver with the operating system vendors such as Microsoft® or Apple®. A successfully certified device driver is incorporated into the operating system, so that automatic detection and installation of the device driver can be carried out. The certification process can be onerous for the manufacturer, and different versions of device drivers must be produced for different operating systems.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for communicating socket protocol based data over a storage protocol based interface is described. In some embodiments, in a transmit mode of a device having a storage protocol (e.g., Universal Serial Bus (USB)) based interface, socket based protocol (e.g., Internet Protocol (IP)) data is encapsulated into storage protocol based data. In response to a storage protocol based read request that is received over a storage protocol based interface, the storage protocol based data is sent. The recipient processes (e.g., decapsulates) the storage protocol based data to recover the socket protocol based data. In a receive mode, a storage protocol based write request encapsulating socket protocol based data is received. The write request is processed (e.g., decapsulated) to obtain the socket protocol based data. An action in response to the socket data is optionally performed.

Figure 1:
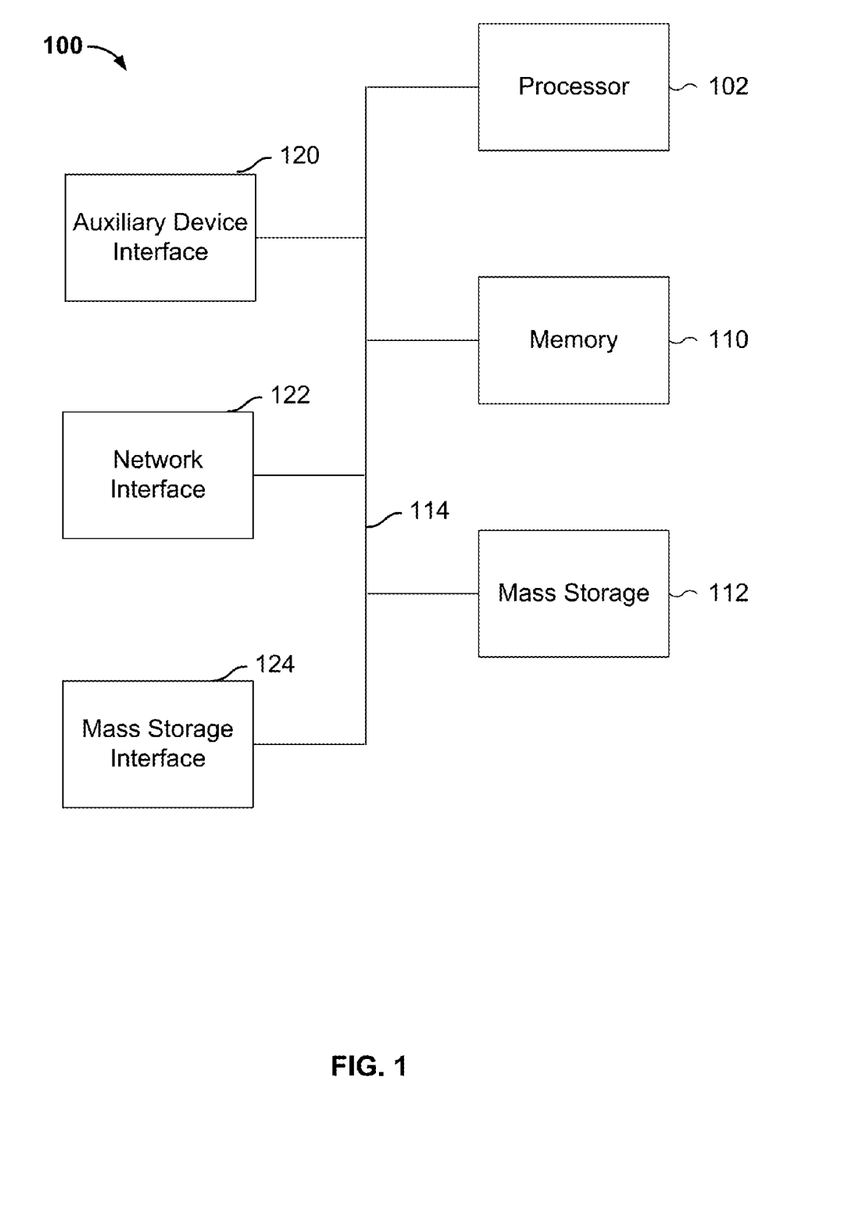
FIG. 1 is a functional diagram illustrating a device configured and managed according to some embodiments of the present invention.

FIG. 1 is a functional diagram illustrating a device configured and managed according to some embodiments of the present invention. In this example, device 100 is a headless device that has no interfaces for humans to directly interact with the device, such as display, keyboard, mouse, touchscreen, etc. Techniques described herein are equally applicable to devices that include user interfaces used for direct human interaction (e.g., display, keyboard, mouse, touchscreen, etc.) as an alternative way to perform device configuration.

Device 100 includes various subsystems as described below. In particular, device 100 includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data and generates output data.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A mass storage 112 provides additional data storage capacity for device 100, and is coupled bi-directionally (read/write) to processor 102. Examples of mass storage include USB flash drive, memory card, etc. Mass storage 112 can store additional programming instructions (e.g., a setup program), data, and the like. It will be appreciated that the information retained within mass storage 112 and 120 can be incorporated, if needed, in standard fashion as part of memory 110 (e.g., RAM) as virtual memory. As will be discussed in greater detail below, the mass storage and its associated mass storage protocols are used to facilitate the communication of socket protocol based data to and from device 100.

In addition to providing processor 102 access to storage subsystems, bus 114 can also be used to provide access to other subsystems and devices. As shown, these can include a network interface 122, a mass storage interface 124, and an auxiliary device interface 120.

Network interface 116 allows device 100 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and output to another network. An interface card or similar device and appropriate software implemented by (e.g., executed/performed on) processor 102 can be used to connect device 100 to an external network and transfer data according to standard protocols.

Mass storage interface 124 allows device 100 to be coupled to an external device such as a host computer, using a mass storage protocol based connection. Details of how the external device communicates with device 100 via the mass storage interface are described below.

An auxiliary device interface 120 can be used in conjunction with computer system 100. The auxiliary I/O device interface can include general and customized interfaces that allow the processor 102 to send and, more typically, receive data from other devices such as microphones, transducer card readers, cameras, etc.

For purposes of illustration, a network interface that includes a Wi-Fi interface, a mass storage interface that includes a USB interface, and an auxiliary device interface that includes a video camera interface are discussed extensively in the examples below. Other types of interfaces may be used in other embodiments. For example, the network interface may include an Ethernet interface, a cellular or satellite telecommunication interface, etc.; the mass storage interface may include a Bluetooth interface, a FireWire interface, a Small Computer System Interface (SCSI), a Serial Advanced Technology Attachment (SATA) interface, etc.; and the auxiliary device interface may include a microphone interface, a card reader interface, etc.

In some embodiments, device 100 requires configuration and management. For example, in embodiments where the networking interface is a Wi-Fi based wireless networking interface, an appropriate network needs to be selected, and a password, if required, is supplied. Since device 100 is headless, a user is unable to directly interact with the device. A typical solution would be to connect the device to a host (such as a laptop), and run a configuration program on the host. A device driver is typically required to establish a way for the host to communicate with the device. Given the complexity of developing and installing a device driver, an alternative solution based on a storage protocol has been developed.

Figure 2A:
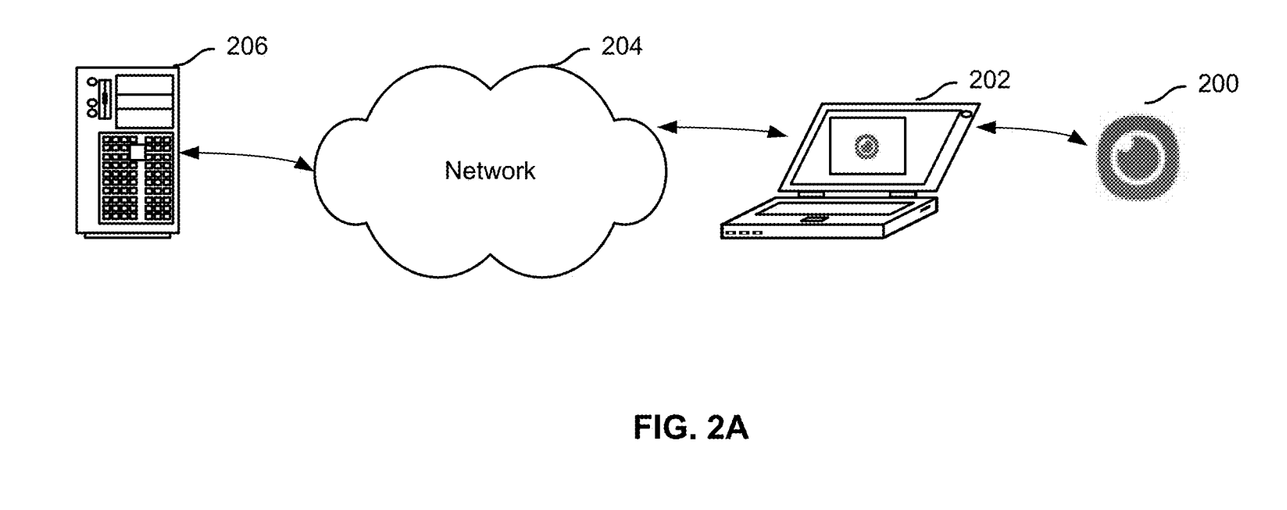
FIG. 2A is a block diagram illustrating an embodiment of a configuration and management setup for a device.

FIG. 2A is a block diagram illustrating an embodiment of a configuration and management setup process for a device. Device 200 can be a video capturing device such as the Dropcam® Wi-Fi Internet Video Camera, a headless device similar to device 100, or any other device that is configurable without directly interactions with a user. Device 200 is connected to a host (e.g., laptop 202) via a mass storage interface connection (e.g., a USB connection that can be wired or wireless). The host is connected to a server (also referred to as cloud service) 206 via a network interface connection (e.g., an Ethernet or a Wi-Fi connection) over a network 204 (such as the Internet).

Initially, device 200 is not connected to server 206 via any network interface connection because the network interface on device 200 requires configuration. As described in FIG. 2B below, the network interface on device 200 can be configured by using the host, via the mass storage interface. Once the network interface is configured, device 200 can communicate with the server 206 via the network interface using standard network protocols (e.g., socket based protocols such as HTTP).

Figure 2B:
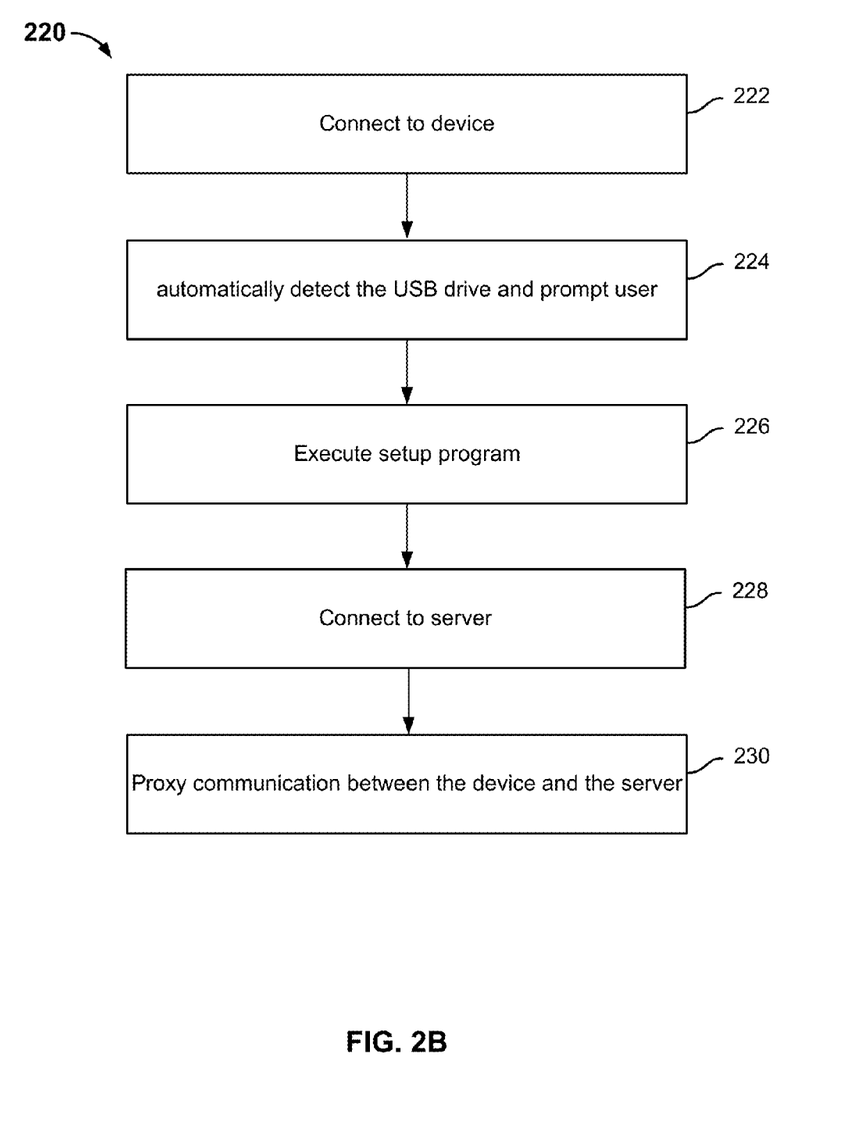
FIG. 2B is a flowchart illustrating an embodiment of a configuration process for the setup shown in FIG. 2A.

FIG. 2B is a flowchart illustrating an embodiment of a configuration process for the setup shown in FIG. 2A.

In most existing operating systems such as Windows™ or Mac™ OS, a USB mass storage driver is built-in and does not require additional device driver installation. The following configuration process takes advantage of this feature, letting the operating system on the host automatically detect the presence of any mass storage device.

Process 220 may be performed on the host. At the beginning of the process, at 222, the host is connected to the device via the mass storage interface, for example via a USB cable or a wireless USB connection between the device and the host. At 224, the operating system on the host automatically detects the mass storage drive that is a part of device 200, and prompts the user to open the file folder corresponding to the mass storage drive. In this example, a setup program is pre-stored on the mass storage drive. The user opens the file folder and invokes the setup program. At 226, the setup program is executed on the host. For example, user and device information may be collected. At 228, the host connects to server 206. The connection can be made by the setup program directly, or by invoking another application on the host (e.g., a web browser). In this case, the connection is a socket based connection.

Once a successful connection is established, at 230, the host acts as a proxy to facilitate the data exchange between the device and the server. In some embodiments, the server sends data intended for the device via the socket connection to the host. The data, which is socket protocol based, is translated by the host into storage protocol based data. Specifically, the socket protocol based data is divided into fixed-sized blocks, and appropriate header such as the overall length of data is added. The translated data is then sent to the device via the mass storage connection to be processed. The device sends data intended for the server via the mass storage connection to the host. This data, which is storage protocol based, is translated by the host into socket protocol based data. The translated data is sent to the server to be processed.

As used herein, a socket protocol refers to a communication protocol that allows read and write operations of data of any length. The protocol does not support the notion of index or address location, and data is read from or written to a stream. In other words, a piece of data is only received or sent once via the stream, and cannot be accessed again later via the stream itself (although the data can be buffered and the buffered data can be accessed). As used herein, a storage protocol refers to a communication protocol that allows read and write operations of fixed-length data only. Data is in read from or written to a specific index or address location. In other words, the protocol maintains a fixed area of storage and allows random access to the storage.

In some embodiments, the device implements an extended version of a storage based protocol (e.g., extended USB mass storage protocol) to allow two-way communication with the host. For example, a standard USB mass storage protocol gives the host exclusive access to the USB drive and prevents the device itself (or any other party) from writing to the USB drive. The extended USB mass storage protocol, on the other hand, allows both the device and the host to write to the USB drive, and coordinates the read/write operations to avoid any conflicts.

Figure 3:
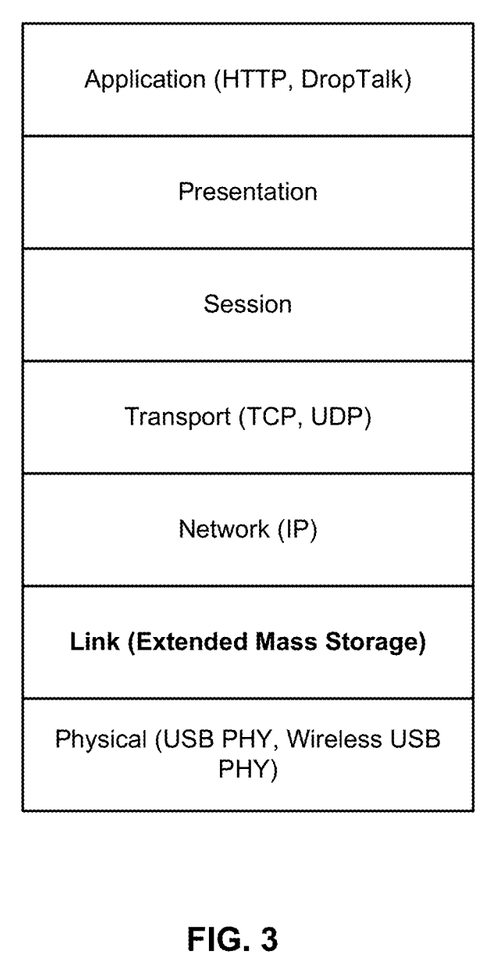
FIG. 3 is a diagram illustrating an embodiment of a protocol stack implemented by a device such as 200.

FIG. 3 is a diagram illustrating an embodiment of a protocol stack implemented by a device such as 200. The protocol stack shown follows the Open Systems Interconnection (OSI) model. In this example, the physical layer implements the standard physical signaling protocol of USB or wireless USB. The link layer is an extended version of the standard USB mass storage protocol. In some embodiments, according to the extended USB mass storage protocol, the device performs all reads and writes at predefined locations, and all the reads and writes are non-cached (i.e., each read or write directly accesses the data source and no cached copy is used). Standard network layer, transport layer, session layer, and presentation layer protocols are implemented. At the application layer, depending on the particular requirement of the application, a standard protocol such as Hypertext Transport Protocol (HTTP) and/or a proprietary protocol such as DropTalk developed by Dropcam, Inc. are/is used. Software executing on the device implements various layers and performs data processing that is appropriate for each layer.

Figure 4:
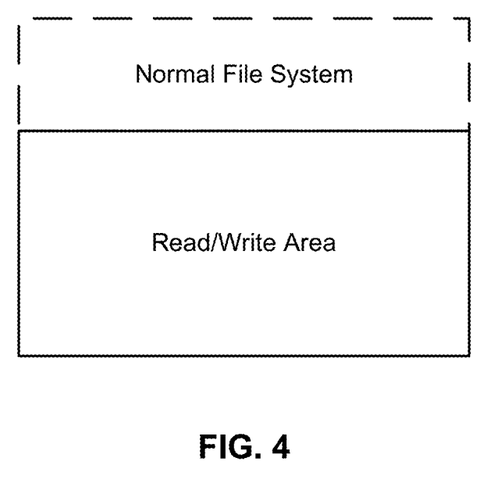
FIG. 4 is a diagram illustrating an embodiment of a storage layout used to support the extend storage based protocol.

FIG. 4 is a diagram illustrating an embodiment of a storage layout used to support the extended storage based protocol. The layout includes a designated read/write area. All the read/write operations supported by the extended protocol are directed to the designated read/write area. This way, the read/write operations of the extended protocol will conform to the standard interfaces of the standard protocol and be compatible with the operating system (e.g., the operating system of the host) that supports the standard protocol. The layout also optionally includes a normal file system as would be required by a standard storage based protocol. It is worth noting that the layout is a logical representation of the storage area and is not necessarily actual physical storage. For example, in one embodiment, the read/write area starts at index 0, and is 2048 bytes long. When a write operation directed to the read/write area is invoked, the device may buffer the data to be written in memory without actually copying the data to the storage location at index 0. Similarly, when a read operation directed to the read/write area is invoked, the device may read available data from memory rather than loading data from the storage location with index 0. Although a single read/write area is shown in this example, in some embodiments, two separate areas (one for read and one for write) may be used as well.

In some embodiments, the device has a transmit mode for transmitting data and a receive mode for receiving data.

Figure 5A:
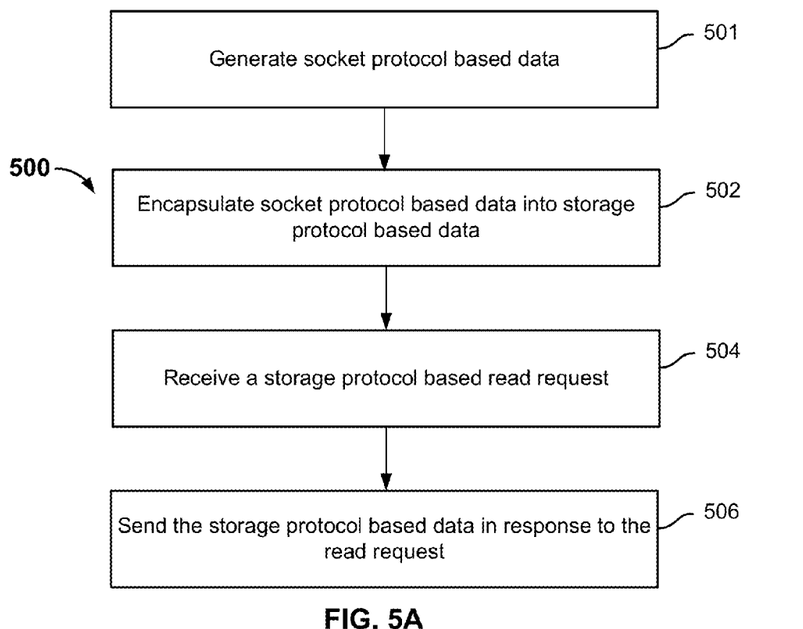
FIG. 5A is a flowchart illustrating an embodiment of a transmit process of an embodiment of a device.

FIG. 5A is a flowchart illustrating an embodiment of a transmit mode process of an embodiment of a device. At the beginning of process 500, data becomes available on the device and needs to be transmitted to the server. The data can include information generated by the device such as video data, request by the device to the server, etc. At 501, the data is formatted into socket protocol based data, for example, a data stream of a certain length. At 502, the socket protocol based data is encapsulated into storage protocol based data. In some embodiments, the encapsulation generates one or more appropriate headers indicating the length of the data, and puts the socket protocol based data into data blocks of fixed length. In some embodiments, the transformation is handled by a mass storage device driver that runs in the kernel/lightweight operating system installed on the device.

In this example, the host polls the device by sending read requests periodically. The read requests are storage protocol based, and are sent via the mass storage interface. At 504, a storage protocol based read request is received. The read request, according to the extended mass storage protocol, is a non-cached read directed to the read area. At 506, in response to the read request, data that is available for transmission (in this case, storage protocol based data that encapsulates socket protocol based data) is sent via the mass storage interface to the host, to be further processed and forwarded on to the server. Although polling by the host is used in this example, a notification based scheme can be used in other embodiments, where the device notifies the host when data is ready for transmission.

Figure 5B:
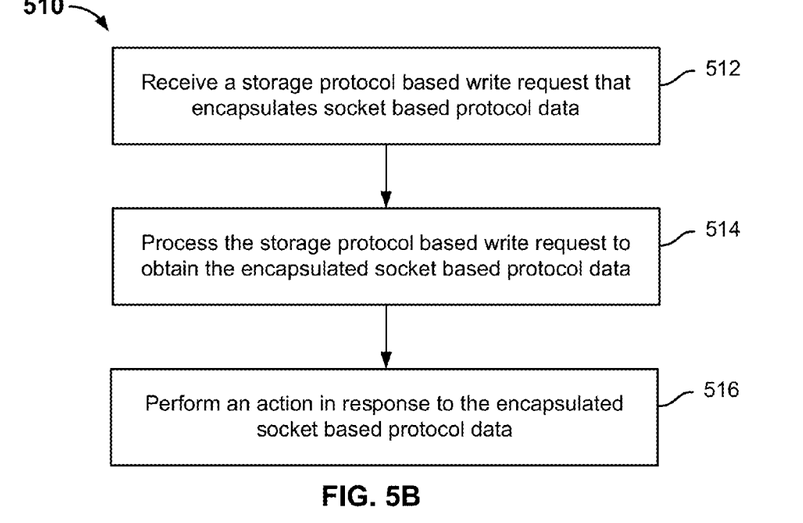
FIG. 5B is a flowchart illustrating an embodiment of a receive process by an embodiment of a device.

FIG. 5B is a flowchart illustrating an embodiment of a receive mode process by an embodiment of a device. At the beginning of process 510, the server sends socket protocol based data to the host to be encapsulated into storage protocol based data and forwarded on to the device as a write request. According to the extended protocol, the write request is a non-cached write directed to the write area of the storage. At 512, the storage protocol based write request is received from the host via the mass storage interface. It encapsulates the original, socket protocol based data sent by the server. At 514, the storage protocol based write request is processed to obtain the encapsulated socket protocol based data. In some embodiments, the processing involves removing storage protocol headers and rejoining fixed blocks of data into a data stream. At 516, in response to the encapsulated socket protocol based data, the device performs an action. For example, if the original data sent by the server is an acknowledgement that a connection has been successfully established, the device can discard the data that is received. If, however, the original data sent by the server is a request for configuration or status information, the device will obtain the information requested, and follow process 500 to send the response data to the server.

Figure 6:
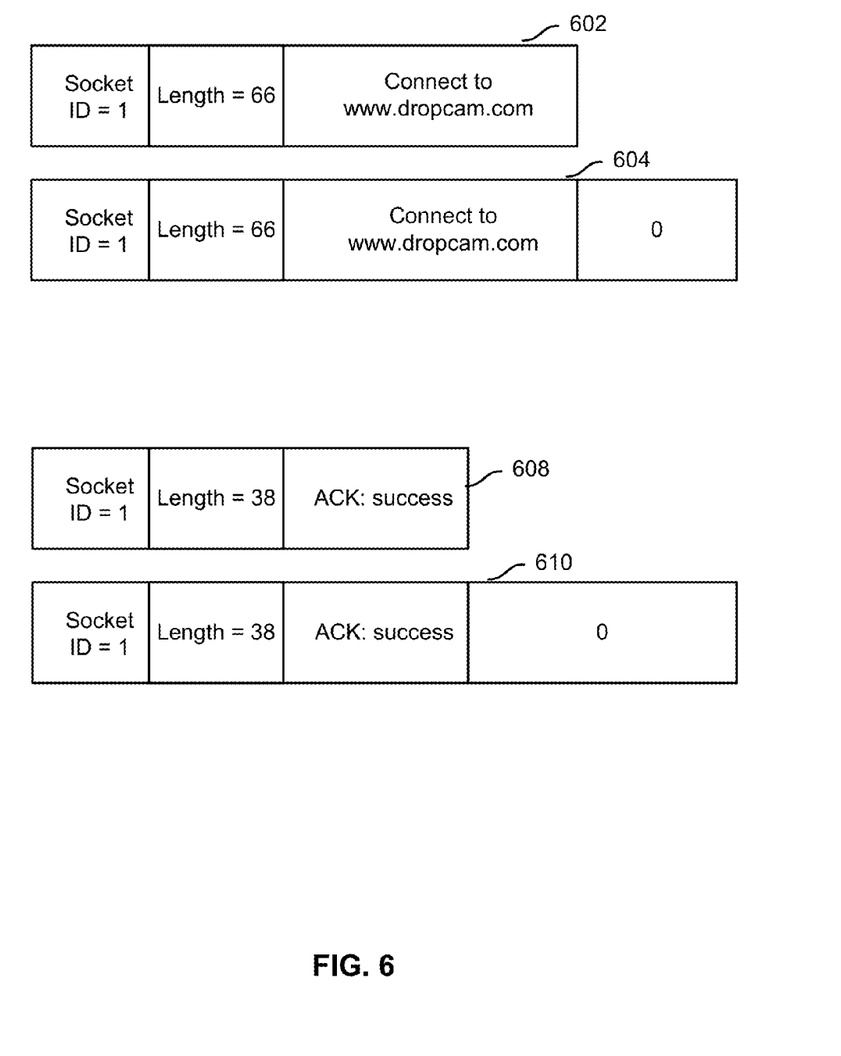
FIGS. 6-8 are data diagrams illustrating examples of data flow.
Figure 7:
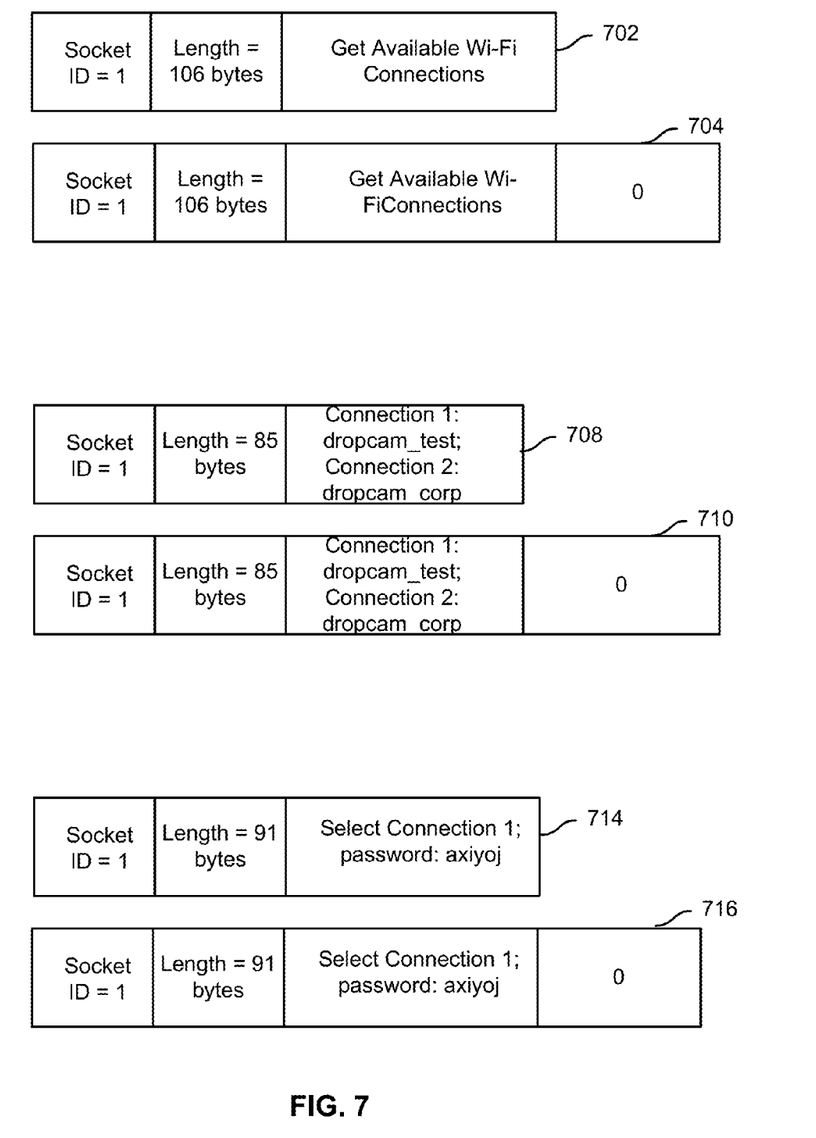
Figure 8:
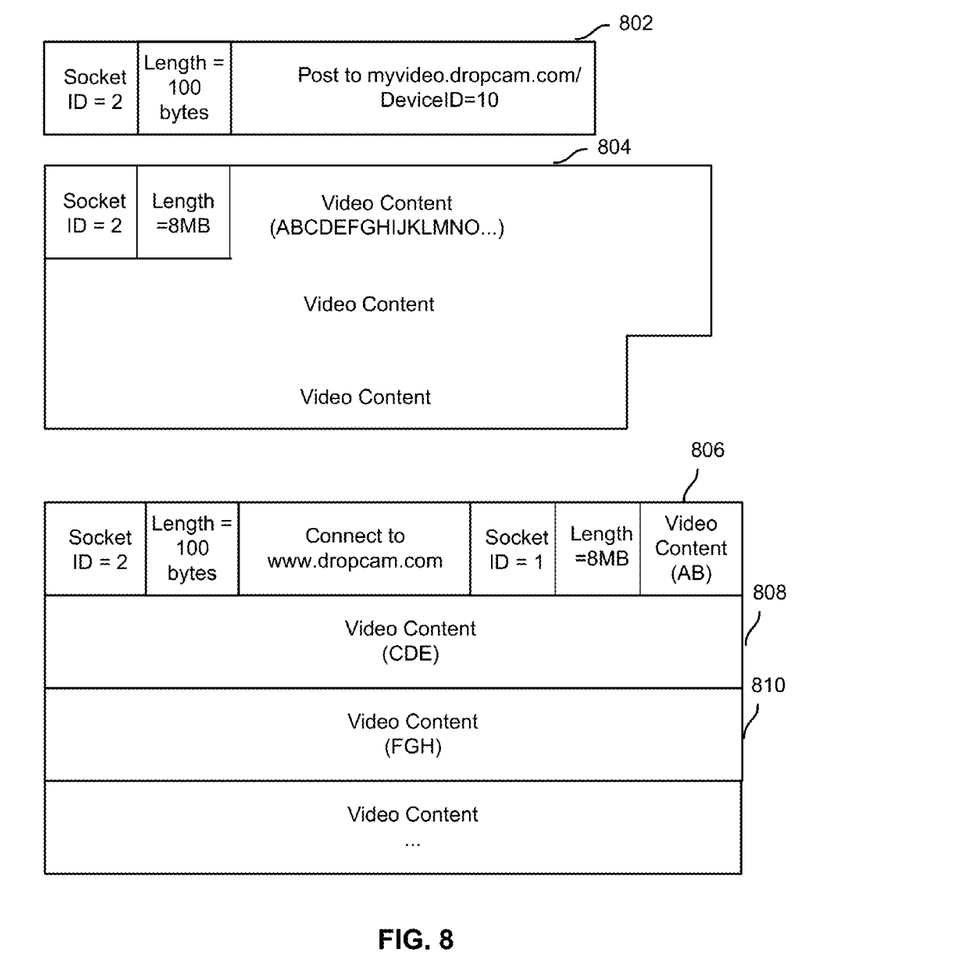

FIGS. 6-8 are data diagrams illustrating examples of data flow.

In FIG. 6, the device attempts to connect to the server with the universal resource locator (URL) of www.dropcam.com. A transmit process may be invoked when a device is first connected to the host for configuration by the user. A read request is made during this process. Data 602 and 604 correspond to data from the device to the server. Initially, application layer software on the device (such as agent software) generates socket protocol based data 602 that corresponds to the request of opening a new socket connection. Data 602 includes a socket ID and a payload length in the header, and a connection request in its payload. Data 602 is then encapsulated into storage protocol based data, specifically a fixed sized read block 604. In this example, the size of data 602 (which is 66 bytes) is smaller than the length of the fixed sized read block (which is 512 bytes); therefore, the remaining portion of block 604 is zero-padded. Data 604 is transmitted to (i.e., read by) the host via the mass storage interface. Specifically, a read request directed towards the read area is made by the host. For example, a "read from index 0, 512 bytes" request can be made by the host as a part of the periodic polling process by the host, or in response to a notification by the device. The extended mass storage protocol code of the device handles the read request by sending to the host data that is ready to be transmitted (in this case, encapsulated data 604).

Upon receiving a storage protocol based data 604, the host translates (e.g., decapsulates) the data back to socket protocol based data 602. Data 602 is transmitted by the host to the server via a standard network connection.

If the connection to the server is successfully made, the server will send an acknowledgement. Application code on the server generates a second socket protocol based data, specifically acknowledgement data 608, and sends it to the host for forwarding to the device. The host encapsulates data 608 into a storage protocol based, fixed sized write data block 610. Again, because the amount of data in 608 is less than the fixed size to block, the un-used portion of data block 608 is zero-padded. The host makes a write request to the device via the mass storage interface, directed to the write area. For example, a "write to index 1, 512 bytes" request can be made by the host to the device. The extended mass storage protocol code of the device handles the write request by decapsulating data block 610 to obtain original socket protocol based data 608. In this case, says the acknowledgement is a successful one, no further action is needed. Should the acknowledgment indicate a failure, the device may reconnect at a later time.

Once the connection is successfully established, the server and the device can commence communication. In FIG. 7, the server asks the device for a list of available Wi-Fi connections. A request for available Wi-Fi connections is formatted as socket protocol based data 702 and sent by the server to the host. The host encapsulates data 702 into a storage protocol based, fixed sized data block 704, and sends 704 to the device as a write request via the mass storage interface.

The device decapsulates 704 to obtain original socket protocol based data 702, processes data 702, and in response generates socket protocol based data 708. In this example, the payload of 708 lists two available connections. Data 708 is encapsulated into a storage protocol based, fixed sized data block 710, which is transmitted to and read by the host. The host decapsulates 710 and restores socket protocol based data 708. Data 708 is sent to the server, which in turn sends the list of available connections to a user interface application on the host, such as the browser, and asks the user to make a selection and enter a password if appropriate.

The configuration information (e.g., user selection and password) is received by the server, which formats the configuration information into socket protocol based data 714 and sends it to the host. The host encapsulates 714 into storage protocol based data 716, and transmits it to the device by sending a write request. The device decapsulates 716 and restores socket protocol based data 714. The device processes 714 and connects to the selected Wi-Fi network with the supplied password. If the connection is successful, the device can commence to communicate with the server via its network (e.g., Wi-Fi) interface and without requiring the host to act as a proxy.

In FIG. 8, the device has generated data (e.g., audio stream, video stream, and/or other media data that is recorded by the device) for posting to a webpage operated by the server. Socket protocol based data 802 includes a post request, and socket protocol based data 804 includes the actual video content to be posted. 802 and 804 are encapsulated into fixed sized storage protocol based data 806, 808, 810, etc. As can be seen, the amount of data included in 802 is less than the fixed data block size, while the amount of data included in 804 is significantly greater than the fixed data block size. The encapsulation process fills the remaining portion of the data block containing 802 with header information and a portion of the video content from 804. The rest of the data blocks are filled with the remaining video content from 804. The storage protocol based data is read by the host, which decapsulates the data, restores the socket protocol based data 802 and 804, and sends the socket protocol based data to the server via a standard network interface. In some embodiments, media data generated by the device (e.g., recorded video data) is continuously posted to the server by encapsulating socket protocol based media data into storage protocol based data and sending the encapsulated data to the server. The server decapsulates the data, stores it, associates the storage location with a URL, and allows users to view the video by accessing a URL hosted by the server.

Communication of socket protocol based data over a storage protocol based interface has been disclosed. The technique allows easy installation and management of devices, in particular headless devices, without requiring an additional driver to be installed on the host. In some embodiments, link layer software performs encapsulation and decapsulation, while higher layer software (e.g., software corresponding to transport layer or higher) generates socket protocol based data and performs data processing.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An electronic device without a user interface for provisioning the electronic device to communicate with a remote server, the electronic device comprising:
    a storage protocol based interface configured to connect to a host, wherein the storage protocol based interface includes a Universal Serial Bus (USB) connection and the host is configured to connect to the remote server and act as a proxy to facilitate data exchange between the electronic device and the remote server; and one or more processors coupled to the storage protocol based interface, configured to:
in a transmit mode:
encapsulate first socket protocol based data into first storage protocol based data;
receive a first storage protocol based read request from the host via the storage protocol based interface; and
send the first storage protocol based data to the host in response to the first storage protocol based read request;
in a receive mode:
receive a first storage protocol based write request from the host that includes second storage protocol based data, wherein second socket protocol based data is encapsulated within the second storage protocol based data; and
process the first storage protocol based write request to obtain the second socket protocol based data, the second socket protocol based data comprising configuration information for a selected network that is available to the electronic device; and
connect with the selected network via a network interface using the configuration information;
wherein the electronic device does not include a user interface that allows a human user to directly interact with the electronic device.

2. The electronic device of claim 1, wherein:
the first storage protocol based data is received by the host;
the first socket protocol based data is extracted from the first storage protocol based data by the host; and
the first socket protocol based data is sent to the remote server by the host.

3. The electronic device of claim 1, wherein encapsulating the first socket protocol based data into the first storage protocol based data includes:
placing the socket protocol based data into one or more fixed-sized blocks;
and adding one or more headers to the one or more fixed-sized blocks.

4. The electronic device of claim 1, wherein according to an extended version of the storage based protocol, the one or more processors are configured to perform reads and writes at one or more predefined locations.

5. The electronic device of claim 1, further comprising a storage comprising a designated read area and a designated write area; and wherein:
the read request is directed to the designated read area; and
the write request is directed to the designated write area.

6. The electronic device of claim 1, wherein the second socket protocol based data includes a request to obtain information pertaining to available network connections.

7. A method of data communication, comprising:
at an electronic device without a user interface for provisioning the electronic device to communicate with a remote server, wherein the electronic device includes a storage protocol based interface configured to connect to a host, the storage protocol based interface includes a Universal Serial Bus (USB) connection, and the host is configured to connect to the remote server and act as a proxy to facilitate data exchange between the electronic device and the remote server:
in a transmit mode:
encapsulating first socket protocol based data into first storage protocol based data;
receiving a first storage protocol based read request from the host via the storage protocol based interface; and
sending the first storage protocol based data to the host in response to the first storage protocol based read request;
in a receive mode:
receiving a first storage protocol based write request from the host that includes second storage protocol based data, wherein second socket protocol based data is encapsulated within the second storage protocol based data; and
processing the first storage protocol based write request to obtain the second socket protocol based data, the second socket protocol based data comprising configuration information for a selected network that is available to the electronic device; and
connecting with the selected network via a network interface using the configuration information.

8. The method of claim 7, wherein:
the first storage protocol based data is received by the host;
the first socket protocol based data is extracted from the first storage protocol based data by the host; and
the first socket protocol based data is sent to the remote server by the host.

9. The method of claim 7, wherein encapsulating the first socket protocol based data into the first storage protocol based data includes:
placing the socket protocol based data into one or more fixed-sized blocks;
and adding one or more headers to the one or more fixed-sized blocks.

10. The method of claim 7, wherein according to an extended version of the storage based protocol, the method performs reads and writes at one or more predefined locations.

11. The method of claim 7, wherein the electronic device includes a storage comprising a designated read area and a designated write area, and wherein:
the read request is directed to the designated read area; and
the write request is directed to the designated write area.

12. A non-transitory computer readable storage medium storing one or more programs configured for execution by an electronic device without a user interface for provisioning the electronic device to a remote server, wherein the electronic device has one or more processors, memory, and a storage protocol based interface configured to connect to a host, the storage protocol based interface includes a Universal Serial Bus (USB) connection, and the host is configured to connect to the remote server and act as a proxy to facilitate data exchange between the electronic device and the remote server, the one or more programs comprising instructions for:
in a transmit mode:
encapsulating first socket protocol based data into first storage protocol based data;
receiving a first storage protocol based read request from the host via the storage protocol based interface; and
sending the first storage protocol based data to the host in response to the first storage protocol based read request;
in a receive mode:
receiving a first storage protocol based write request from the host that includes second storage protocol based data, wherein second socket protocol based data is encapsulated within the second storage protocol based data; and processing the first storage protocol based write request to obtain the second socket protocol based data, the second socket protocol based data comprising configuration information for a selected network that is available to the electronic device; and connecting with the selected network via a network interface using the configuration information;

wherein the electronic device does not include a user interface that allows a human user to directly interact with the electronic device.

13. The computer readable storage medium of claim 12, wherein:

the first storage protocol based data is received by the host;

the first socket protocol based data is extracted from the first storage protocol based data by the host; and the first socket protocol based data is sent to the remote server by the host.

14. The computer readable storage medium of claim 12, wherein encapsulating the first socket protocol based data into the first storage protocol based data includes:

placing the socket protocol based data into one or more fixed-sized blocks;

and adding one or more headers to the one or more fixed-sized blocks.

15. The computer readable storage medium of claim 12, wherein according to an extended version of the storage based protocol, the one or more programs are further configured to perform reads and writes at one or more predefined locations.

16. The computer readable storage medium of claim 12, wherein the electronic device includes a storage comprising a designated read area and a designated write area, and wherein:

the read request is directed to the designated read area; and the write request is directed to the designated write area.

* * * * *